UNITED STATES PATENT OFFICE.

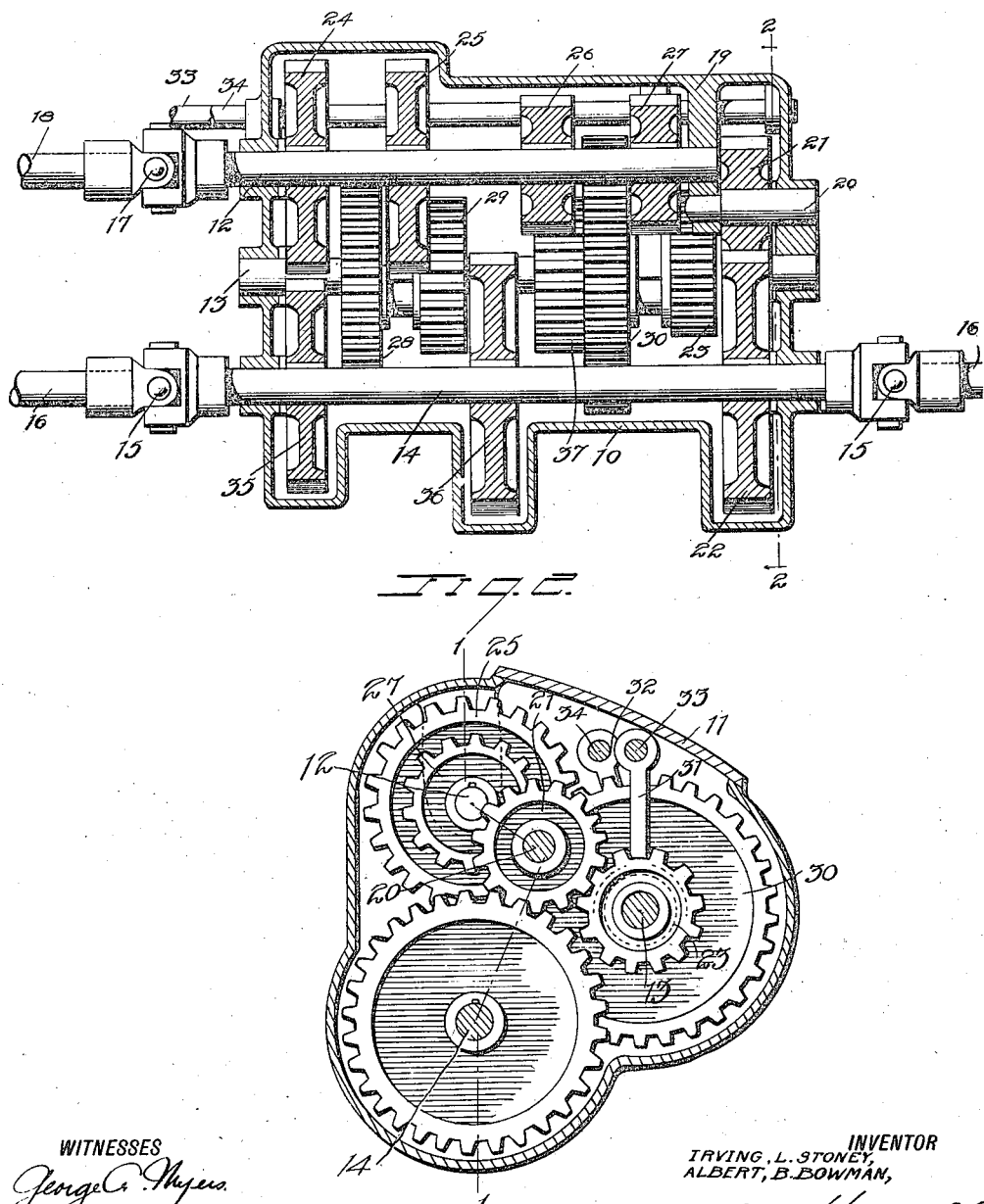

IRVING L. STONEY AND ALBERT B. BOWMAN, OF ALMA, MICHIGAN.

DOUBLE-DRIVE GEAR SET.

1,285,456.   Specification of Letters Patent.   Patented Nov. 19, 1918.

Application filed January 30, 1918.  Serial No. 214,457.

*To all whom it may concern:*

Be it known that we, IRVING L. STONEY and ALBERT B. BOWMAN, citizens of the United States, and residents of Alma, in the county of Gratiot and State of Michigan, have made certain new and useful Improvements in Double-Drive Gear Sets, of which the following is a specification.

Our present invention relates generally to drive means for automobiles, motor trucks and the like and particularly to an improved gear set which will take the place of the ordinary transmission as used on such vehicles, our object being the provision of a simple compact gear set which will combine the feature of making it possible to drive with all four wheels, the arrangement being such as to obviate the necessity of any form of transmission chain drive and permit of a direct drive from the gear set to both the front and rear axles.

The specific construction employed in carrying out our invention, constituting the preferred embodiment thereof, is shown in the accompanying drawing, forming a part of this specification, and wherein—

Figure 1 is a longitudinal section taken substantially on the line 1—1 of Fig. 2, and Fig. 2 is a transverse section taken substantially on the line 2—2 of Fig. 1.

Referring now to these figures, our invention contemplates the provision of a gear set located within a casing 10 shaped to the arrangement of gears of the gear set and which may have a cover 11 as seen in Fig. 2, the said casing having bearings at its ends for the power shaft 12, counter-shaft 13, and drive shaft 14, the opposite ends of the latter of which project beyond the opposite ends of the casing 10 so that it may be connected at both ends as for instance by universal joints 15 with connecting shafts 16, the latter of which may lead to the front and rear axles of the vehicle in connection with which the gear set is utilized.

The power shaft 12 is connected at one end as by means of a universal joint 17 with the engine shaft 18 and its opposite end is journaled in an internal bearing 19 of the casing spaced from one end thereof, which bearing 19 also supports one end of a short reversing shaft 20, the latter also being in parallel relation with the shafts 12, 13 and 14. This reversing shaft 20 supports a gear 21 in mesh with a larger gear 22 secured upon the drive shaft 14 adjacent the respective end of the casing 10, which gear 21 is adapted to be engaged by a gear 23 of the counter-shaft 13.

The power shaft 12 is provided with a stationary series of gears 24, 25, 26 and 27, each fixed thereto and arranged to be selectively engaged by gears 28, 29 and 30 slidable upon the counter-shaft 13 and under control of shifting forks 31 and 32 as is seen in Fig. 2, the latter being fixed upon shifting rods 33 and 34 slidable through the ends of the casing 10.

The gears 28 and 29 of the counter-shaft 13 are fixed to one another, the former being shiftable into engagement with either of the gears 24 and 25 of the power shaft 12. Opposite the gear 24 of the power shaft, the drive shaft 14 has a fixed gear 35 into which the gear 28 is shiftable so as to directly connect the gears 24 and 35 and form the high speed connection of the gear set.

The drive shaft 14 also has a fixed gear 36 into which the gear 29, fast with the gear 28, is shiftable when the said gear 28 is in engagement with the gear 25 of the power shaft 12 so as to form the intermediate speed connection of the gear set.

Adjacent and fixed to the gear 30 of the counter-shaft 13, which is fixed to the gear 23 thereof, is a gear 37 engageable with the gear 36 of the drive shaft 14 when the gear 30 is moved into engagement with the gear 26 of the power shaft 12, the gear 23 as before stated being movable into engagement with the reversing gear 21 when gear 30 is shiftable in the opposite direction to engage the gear 27 of the power shaft 12.

Thus when gear 30 engages gear 26 and gear 37 engages gear 36, the lower speed connection of the gear set is formed, while as described shifting of the gear 30 in the opposite direction completes the reverse connection of the gear set.

From this it is obvious that the control of the gears arranged in this particular manner will be extremely simple and that the arrangement permits of readily and easily changing gears through the shifting of the counter-shaft gears, inasmuch as the power shaft 12 is always in motion, while the motor or engine is running and the further fact that as will be observed by reference to Fig. 1, the gears 24, 25, 26 and 27 of the power shaft 12 are wider than the gears of the drive shaft 14. This renders positive the change of gears in every instance by allowing the sliding gears of the counter-shaft to mesh with the gears of the power shaft before engaging the gears of the drive shaft 14.

We claim:

1. In a gearing of the character described, the combination of a power shaft, a drive shaft parallel with the power shaft, a gear casing in which the said shafts are journaled and beyond which the opposite ends of the drive shaft project for the purpose described, a counter-shaft journaled within the gear case parallel to the power and drive shafts, gears fixed in series upon each of said power and drive shafts, and independently movable sets of gears adjustable on the counter-shaft to engage the gears of the power and drive shafts, the gears of each set being fixed to one another.

2. A gearing of the character described comprising parallel power and drive shafts, a counter-shaft parallel with the power and drive shafts, gears fixed upon the power and drive shafts in spaced relation, and independently movable sets of gears shiftable on the counter-shaft to engage and connect the gears of the power and drive shafts, the fixed gears of the power shaft being of greater width than those of the drive shaft whereby to provide for their engagement by the gears of the counter-shaft in advance of engagement of the latter with the gears of the drive shaft.

3. A gearing of the character described comprising parallel power and drive shafts, a counter-shaft parallel to the power and drive shafts, gears arranged in fixed series upon the power and drive shafts and in spaced relation, a reversing shaft parallel to the first named shafts and having a gear thereon in permanent mesh with one of the fixed gears of the drive shaft, and gears arranged in independently movable sets upon the counter-shaft and shiftable to engage and connect the gears of the power, drive and reversing shafts, the gears of each of said sets being fixed to one another.

4. A gearing of the character described comprising parallel power and drive shafts, a counter-shaft parallel to the power and drive shafts, gears arranged in fixed series upon the power and drive shafts and in spaced relation, a reversing shaft parallel to the first named shafts and having a gear thereon in permanent mesh with one of the fixed gears of the drive shaft, and gears arranged in independently movable sets upon the counter-shaft and shiftable to engage and connect the gears of the power, drive and reversing shafts, the gears of each of said sets being fixed to one another, and one of said sets including a gear engageable with the gear of the reversing shaft when another of the gears of the same set is in engagement with one of the gears of the power shaft.

5. In a gearing of the character described comprising a power shaft, a drive shaft driven from the power shaft, each of said shafts having gears fixed thereon in spaced relation, a counter-shaft in parallel relation to the power and drive shafts, gears shiftable on the counter-shaft and arranged in independently movable sets to engage and connect the gears of the power and drive shafts, the gears of the power shaft being arranged relatively to the other gears to cause their engagement by the gears of the counter-shaft previous to the engagement of the latter with the gears of the drive shaft.

6. In a gearing of the character described comprising a gear casing, a power shaft journaled therein, a drive shaft journaled through the gear casing, sets of gears fixed upon the power and drive shafts in spaced relation, a counter-shaft journaled in the gear casing parallel to the power and drive shafts, and gears shiftable upon the counter-shaft to engage and connect the gears of the power and drive shafts, said gears of said counter-shaft being arranged in two independently movable sets of which the gears of each set are fixed to one another, shifting rods journaled through the gear casing, and forks carried by the said shifting rods and engaging the gear sets of the counter-shaft to independently shift the latter.

7. A gearing of the character described comprising a power shaft having large and small pairs of gears in spaced relation, a drive shaft in parallel relation to the power shaft and provided with large and small gears, a reversing shaft parallel to the power and drive shafts and having a gear thereon, a gear mounted on the drive shaft and in engagement with said gear of the reversing shaft, a counter-shaft parallel to the power and drive shafts, a pair of independently movable gear sets mounted in independently shiftable relation upon the counter-shaft, each of said gear sets including a gear movable between one of the pairs of gears of the power shaft to engage either thereof, and another gear fixed to the first gear and movable into engagement with one of the gears of the drive shaft, and one of said gear sets including a third gear movable into engagement with the gear of the reversing shaft.

IRVING L. STONEY.
ALBERT B. BOWMAN.

Witnesses:
F. H. ROWLAND,
D. L. JOHNSON.